Patented Apr. 18, 1950

2,504,136

UNITED STATES PATENT OFFICE 2,504,136

TEXTILE DECORATING

Samuel Lee, Yonkers, N. Y., assignor to Interchemical Corporation, New York, N. Y., a corporation of Ohio No Drawing. Application January 21, 1948,
Serial No. 3,567

15 Claims. (Cl. 260—29.7)

This invention relates to the pigment-decoration of textiles and is particularly concerned with the use in the dyeing and the printing of fabrics and textile materials of a composition comprising a pigmented dispersion of a solid thermoplastic copolymer of a monovinyl aromatic compound and a conjugated diolefin, and a volatile organic liquid.

Pigmented compositions, either in the form of a pigmented lacquer containing a pigment-binder, usually an organic solvent-soluble thermosetting resin, or in the form of an emulsion of an aqueous medium with such a pigmented lacquer, have gone into extensive use in the printing and the dyeing of textiles and similar fabrics. The resulting pigment-decorated textile possesses the disadvantage, however, of crocking to a more or less extent, i. e., of yielding a portion of its color to another material such as another fabric, for example, when the latter is rubbed thereover. Fabrics printed or dyed in deep shades exhibit the greatest tendency to crock, and the full utilization of pigments in the decoration thereof has accordingly been limited.

Various procedures have been suggested heretofore for elimination or reduction of this tendency of such pigment-colored fabrics to crock, but all are objectionable for one reason or another. For example, the degree of crocking can be readily reduced by overpadding the pigment-printed or -dyed textile material with a solution of a suitable resin in an organic solvent and then heating the fabric to set and cure the resin. This process, however is expensive and also requires a double treatment of the fabric, an operation that the trade resists. The degree of crocking can also be reduced by incorporating a larger amount of resin in the initial composition. This procedure is likewise expensive and, in addition, there is frequently also a loss of color value. Furthermore, both procedures generally result in the production of a finished fabric having an objectionable boardiness or stiffness.

I have now discovered that the crockfastness of such a pigment-printed or -dyed fabric can be materially improved, without imparting an objectionable hand to the finished fabric and with improvement in the color value, by utilizing as the printing paste or the dye bath a composition comprising a pigmented dispersion of a high molecular-weight solid thermoplastic copolymer of a monovinyl aromatic compound and a conjugated diolefin, and a volatile organic liquid. Advantageously, in carrying out the present invention, I utilize a composition comprising a pigmented dispersion of such a solid copolymer of styrene and butadiene-1,3, and a solution of a thermosetting resin in a volatile organic solvent in order to render the finished fabric washfast as well. The resulting decorated fabric possesses an unusually high degree of crockfastness, and printings and dyeings in considerably deeper shades than have heretofore been deemed feasible can be obtained.

The present pigmented monovinyl aromatic compound-conjugated diolefin copolymer dispersion can be satisfactorily and successfully applied to a fabric either as such or in the form of an aqueous emulsion. In either case, a substantial improvement in crock-resistance is obtained; and the decorated fabric exhibits an increased color value and retains a relatively soft hand despite the deposition of additional solid material thereon.

In its simplest form accordingly my textile-decorating composition comprises essentially a pigmented dispersion of a solid thermoplastic copolymer of a monovinyl aromatic compound and a conjugated diolefin, and a volatile organic liquid. In its preferred form my composition comprises a pigmented dispersion of a solid thermoplastic copolymer of styrene and butadiene-1,3, and a solution of a pigment-binder, advantageously a thermosetting resin, in a volatile organic solvent. In its emulsion form, the present composition comprises essentially water or a substantially aqueous medium emulsified preferably as the inner phase with such a pigmented copolymer dispersion.

The monovinyl aromatic compound-conjugated diolefin copolymer comprises any of those polymeric products that are disclosed in the Guss et al. patent, No. 2,388,685. As described in this patent, to which reference is made for full details, these copolymers are prepared by first polymerizing the monovinyl aromatic compound in an aqueous emulsion until at least 90% of such aromatic compound is polymerized and then adding the conjugated diolefin to the resulting emulsion of the vinyl aromatic compound polymer and polymerizing the same therein. The resulting copolymers are unusually flexible thermoplastic solids that retain their flexibility over an exceptionally wide range of temperatures. While having somewhat of a rubbery appearance, they do not, however, possess the resilience, elasticity, and softness of the rubber-like copolymers prepared by polymerizing a mixture of a vinyl aromatic compound and a diolefin and are readily distinguishable therefrom. Moreover, the present copolymers are obtained only by conducting the polymerization of the two ingredients in the order indicated.

As explained in the Guss et al. patent, the initial emulsion of the vinyl aromatic compound may be neutral, acidic, or alkaline and may contain any of the usual emulsifying agents such as the sulfuric acid esters of lauryl or other higher aliphatic alcohols. A customary polymerization catalyst such as benzoyl peroxide or ammonium persulfate may also be included therein. Polymerization of the vinyl aromatic compound is effected by heating the initial emulsion thereof with agitation to a temperature above 50° C., preferably between 75 and 100° C., until such polymerization is substantially complete. The conjugated diolefin is then added to the vinyl polymer emulsion in a ratio between 2.3 and 3.5, preferably between 2.7 and 3.1, moles per mole of the vinyl aromatic compound initially present; and the resulting mixture is heated with agitation to a temperature above 50° C., preferably between 75 and 100° C., until polymerization of the diolefin is nearly complete. Any of the customary rubber antioxidants may then be added to the copolymer emulsion, coagulation of which can be effected in any of the usual ways. The coagulated product is generally recovered in the form of a powder or small granules and is advantageously used as such in carrying out the present invention.

Although any monovinyl aromatic compound such as para-methyl-styrene, ortho-ethyl-styrene, para-chloro-styrene, and the like may be utilized in the preparation of the present copolymer, styrene is preferred for this purpose. Similarly, although any conjugated diolefin such as isoprene, 2,3-dimethyl-butadiene-1,3, and the like may be employed, butadiene-1,3 itself is preferred as the diolefin ingredient.

Dispersion of the vinyl aromatic-diolefin copolymers, which are generally insoluble in organic solvents but readily swell in the presence of many types of organic liquids, can be accomplished simply by agitating the copolymer, in granular form, with a suitable organic liquid for a time on the order of up to several hours. Heat has been found to promote the action of the organic liquid on the copolymer and may be applied during the production of the dispersion if desired. Care should of course be observed that the final composition is smooth and homogeneous in texture.

The resulting dispersion is colloidal in nature and, depending on the proportions in which the copolymer and the organic liquid are mixed, may vary from a fluid colloidal solution of the copolymer in the organic liquid (relatively low concentrations of the copolymer) to a semisolid colloidal gel or gel-like mass in which the organic liquid appears to be absorbed by the copolymer (relatively high concentrations of the copolymer). That the dispersion of the copolymer is colloidal in nature is borne out by the fact that, in either case, no separation or settling out of the copolymer is apparent regardless of the extent to which the dispersion is cut or diluted with additional organic liquid. For ease in handling, especially as a base from which the desired textile-decorating composition can be produced, the dispersion is advantageously prepared in its semisolid gel form.

While the present composition may comprise a simple dispersion of the copolymer and the organic liquid in those cases where the washfastness of the decorated fabric is of no moment, an organic solvent-soluble pigment-binder is preferably also incorporated therein to impart wash- and scrub-resistance to the finished textile material. This binder may comprise any suitable plastic or solid film-forming, water-resistant material such as a cellulose derivative, e. g., ethyl cellulose, or a resin that is soluble in the organic liquid of the dispersion and, if an emulsion is to be used, insoluble in water. Advantageously, however, a film-forming thermosetting resin is utilized as the binder. Various types of water-insoluble, organic solvent-soluble thermosetting resins such as urea-aldehyde resins including urea-formaldehyde resins, melamine-aldehyde resins including melamine-formaldehyde resins, phenol-aldehyde resins including phenol-formaldehyde resins, and the like can be used for this purpose. In such case, an alkyd resin such as a drying oil-modified alkyd may also be desirably incorporated in the composition, in accordance with customary practice, to improve the resistance of the decorated textile to washing and dry-cleaning.

The organic liquid from which the dispersion is prepared should be a nonsolvent for the copolymer but should have a swelling action therefor, as already indicated. It must be readily volatile so that it can be evaporated by passage of the wet fabric over conventional drying equipment. If a thermosetting resin is to be incorporated in the dispersion, the organic liquid selected should be a solvent therefor; and where the dispersion is to be used in its emulsified form, the organic liquid must be water-immiscible. Suitable liquids include various esters and ketones, aliphatic and aromatic hydrocarbons such as turpentine, mineral spirits, and xylene, chlorinated hydrocarbons, and the like, which readily swell the vinyl aromatic-diolefin copolymer. Because they are also excellent solvents for the thermosetting resins, particularly the urea- and melamine-formaldehyde resins, used as pigment-binders, aromatic hydrocarbons and terpenes or solvent mixtures consisting predominantly of such hydrocarbons are preferred.

Any pigment can be incorporated into the present composition, but the pigment employed in any particular application should of course be selected in view of the nature of the finished goods and the expected use thereof; that is, it should be satisfactorily lightfast, if necessary it should not bleed to any substantial extent in dry-cleaning solvents such as naphtha and carbon tetrachloride, it should be resistant to soap to the degree required, or the like. Typical examples include the phthalocyanines, various metal oxides, carbon black, water-insoluble vat and azo dyestuffs, and the like. Especially satisfactory results have been obtained with the present composition with the use of inorganic types of pigments as the coloring material.

In the preparation of the present composition, a base dispersion of the vinyl aromatic-diolefin copolymer is first prepared by adding the copolymer in a powdered or granular form to an appropriate organic liquid preferably in proportions to form a semisolid colloidal gel and continuously agitating the resulting mixture until a smooth gel-like product is obtained. A pigmented lacquer is separately prepared by milling or flushing a pigment into an organic solvent, which may desirably be the same as the liquid utilized for the copolymer dispersion and in which a pigment-binder, usually an organic solvent-soluble thermosetting resin, has generally already been dissolved. A dispersing agent may be included in this lacquer. The copolymer dispersion and the pigmented lacquer are then admixed as by simple mechanical agitation; and the resulting color concentrate, which is unusually stable, can be either used as such or cut with further solvent or other vehicle to the desired dyeing or printing consistency and shade.

Alternatively, pigment in powdered form, with or without a dispersing aid such as calcium stearate, and a lacquer comprising a solution of the thermosetting resin in the organic solvent, may be separately added to the copolymer gel base with continued agitation until the pigment is wet out. Dispersion of the pigment for its optimum color value may then be completed by any conventional procedure such as roll-milling or ball-milling.

Where the present composition is to be used in the form of an emulsion, a vehicle concentrate is separately prepared in the customary manner by emulsifying water, which may contain an emulsion stabilizer such as common salt, desirably into a suitable organic solvent, which contains an emulsifying binder such as an alkyd-type resin or a cellulose ether dissolved therein. This concentrated water-in-lacquer emulsion is then cut with additional organic solvent and further water is emulsified thereinto to provide a vehicle or clear having the desired printing or dyeing consistency. The color concentrate is now cut with this vehicle in the proportions necessary to produce the specified shade.

Variations of these methods of preparation can, of course, be utilized. For example, the color concentrate can be cut with additional copolymer dispersion instead of straight solvent where it is desired to increase the ratio of copolymer to pigment. Again, the color concentrate can be prepared in the form of an emulsion, if desired, by adding further solvent and emulsifying water thereinto. Moreover, a clear concentrate can be prepared with the copolymer dispersed in the lacquer phase thereof and can be utilized in place of the customary alkyd resin clear concentrate. In this latter case it has been observed that the copolymer itself possesses an excellent water-in-oil emulsifying property and can be utilized in place of an alkyd or a cellulose ether for this purpose.

The appearance of the present composition varies, of course, with the desired consistency and the manner of preparation thereof. For example, the gel-like base dispersion possesses a relatively high yield value and is not readily flowable by itself; nevertheless, when suitably pigmented, it can be used for printing textiles, for it easily and smoothly wipes into and separates from an intaglio-type engraving. Cutting of the color concentrate with a straight solvent or lacquer vehicle results in a composition having a thinner, more fluid body; whereas cutting with an emulsion clear results in a composition having the consistency of such clear, which will have been bodied more or less in accordance with the expected use of the colored composition, a more paste-like consistency generally being preferred for printing operations.

The proportions of the several ingredients of the present composition may vary widely and depend largely on the requirements of the finished fabric and the nature of the particular application. The depth of color desired obviously governs the amount of pigment used. The copolymer should be sufficient in amount to render the finished fabric satisfactorily crockfast; and the amount of pigment binder should similarly be sufficient to impart the necessary degree of washfastness to the finished fabric.

Advantageously, the copolymer and the pigment are present in a ratio ranging from about 0.05:1 to 100:1 by weight and preferably from 0.2:1 to 10:1 by weight. Although some increase in crock-resistance can be obtained with a lower ratio, satisfactory improvement in crockfastness first becomes appreciably noticeable when the copolymer and the pigment are present in about the indicated minimum ratio. There is not much to be gained in utilizing the copolymer and the pigment in a ratio greater than the indicated maximum since the shade of the resulting decorated fabric is then so light that crocking no longer presents a problem.

In this connection, it should be borne in mind that the percentage of pigment in the present composition and the nature of the dispersion itself place a practical limit on the percentage of the copolymer that can be incorporated therein in any given instance. Obviously, in a composition containing a relatively high amount of pigment, the practical maximum ratio of copolymer to pigment is less than the corresponding maximum ratio when the composition contains a relatively low amount of pigment. Since the actual textile-decorating composition itself is usually prepared by cutting a color concentrate containing the copolymer with a suitable vehicle or clear in proportions to produce the desired depth of shade, obviously the percentage of pigment in the resulting composition decreases the more the color concentrate is cut with the clear while the ratio of copolymer to pigment remains the same. If the vehicle also contains a vinyl aromatic-diolefin copolymer dispersed therein, then the ratio of copolymer to pigment obviously increases the more the color concentrate is cut.

The organic dispersing liquid and the copolymer are utilized in proportions, depending on the particular composition, ranging from a ratio of 1:1 (the gel-like base) to a ratio of 100:1 by weight (the pigmented printing or dyeing lacquer or emulsion). Attempts to prepare a base dispersion containing a higher proportion of the copolymer result in a doughy, pasty mass that has a yield value so high that the composition cannot be satisfactorily cut with a clear or otherwise handled. While compositions containing a higher proportion of the organic liquid than the indicated maximum can be utilized, there is little point in doing so. In the preparation of the gel base, the organic liquid and the copolymer are preferably utilized in a ratio of at least 3:1 but not more than 10:1, within which range the most satisfactory gel structure is obtained.

Where a thermosetting resin is included in the composition as a pigment-binder, the resin and the pigment are present within the customary ratio ranging from 0.05:1 to 10:1 by weight and generally from 0.25:1 to 1:1 by weight. In those compositions that also include an alkyd resin, the ratio of the combined resins to the pigment can, of course, range up to a maximum of 100:1 by weight.

The percentage of the aqueous phase in the emulsified form of the present dispersion is determined not only by the type of emulsion selected but also by the use to which it is to be put. As is well known, for example, the consistency of a lacquer-in-water type of emulsion becomes increasingly thinner as the proportion of the water phase is increased so that, for printing, the aqueous phase comprises a smaller percentage of the entire composition than for dyeing. Conversely, in printing with the present composition in the form of a water-in-lacquer emulsion, the aqueous phase comprises a higher percentage of the total composition than in dyeing therewith since, as is well known, the emulsification of an increasing amount of water into such an emulsion tends to thicken it. In the latter case, as pointed out in the Jenett patent, No. 2,222,581, the aqueous phase should comprise at least 20% of the entire composition by weight; and the aqueous phase usually comprises from 40 to 80% by weight of the composition in customary practice.

In the copolymer-containing emulsion clear, the organic liquid and the copolymer are also utilized in proportions ranging from a ratio of 1:1 (the clear concentrate) to a ratio of 100:1 by weight (the cut clear comprising the vehicle for the color concentrate). Generally, the organic liquid and the copolymer are preferably present in the clear concentrate in a ratio ranging from 1:1 to 4:1 and in the cut clear in a ratio ranging from 10:1 to 50:1.

The percentage of the aqueous phase in this emulsion clear varies, of course, with the nature of the clear itself but comprises at least 10% of the entire composition by weight. In the clear concentrate, the aqueous phase usually comprises from 10 to 30% of the composition and, in the cut clear, from 40 to 80%.

Where the present composition is to be utilized in the printing of a fabric, it can be applied thereto in any convenient manner as from an intaglio cylinder. Where it is employed in the dyeing of fabric, it can be applied by means of a pad-dyeing operation; or it can be deposited on the fabric in the form of a thin film by transfer from a roll-coating machine. The decorated fabric can be conveniently dried by passage over conventional drying equipment such as a bank of steam-heated drying cans maintained at a temperature in the range of 210 to 250° F.; and the dried fabric, if it is desired to do so, can be passed through a curing chamber maintained at a temperature of 300 to 350° F. to cure the thermosetting resin, where it comprises the pigment binder. Under certain conditions air-drying of the decorated fabric may be sufficient.

The effectiveness of the monovinyl aromatic compound-conjugated diolefin copolymer as a crock-reducing agent appears to be due to its exceptional flexibility and to its unusual ability to resist abrasion. The tough, flexible film of the copolymer deposited about the pigment particles on the fabric upon drying thereof is, I believe, largely responsible for the markedly increased crock resistance obtained with the present composition.

The reduction in the degree of crocking accomplished with the instant composition can be effected whether a deep or a light shade is desired in the finished fabric; and my invention thus permits the wide application and full utilization of pigments in the decoration of textiles. Fabrics can be colored a deep shade with the present composition with substantial elimination of dry crock and material reduction of wet crock. Particularly important applications of my improved composition lie in blotch printing, i. e., the printing of designs containing large areas of solid color, and in pad-dyeing.

A particular advantage of my invention is that, the copolymer being substantially inert to reactive media, it is compatible with even the most reactive resins and pigments which can ordinarily be utilized only to a limited extent under controlled conditions. The shelf life of the present composition as well as its stability in packaged form is accordingly exceptional.

As is the case with the pigment-binder, the copolymer is deposited on the fabric in discontinuous films that do not bridge over the individual yarns regardless of whether the straight disperson or the emulsion is used. No appreciable boardiness, accordingly, is imparted to the decorated fabric, which retains substantially its initial hand. Moreover, despite the deposition of an additional discontinuous film on each fiber, the resulting fabric possesses generally a deeper, fuller color value which appears to be at least in part attributable to the presence of the dispersed copolymer. In comparison, a pigmented emulsion containing an increased amount of thermosetting resin in the lacquer phase imparts a marked boardiness to the resulting decorated fabric, the color value of which, especially in the deeper shades, is also adversely affected. In addition, some improvement in washfastness, a better light-wash-resistance, and an increased resistance to dry-cleaning solvents are obtained.

Various types of fabrics can be decorated by means of my improved composition and the application of my invention is not limited to the decoration of any particular fabric. Excellent resistance to crocking and excellent color value without boardiness of the finished fabric are obtained equally well whether the fabric being decorated is composed of natural fibers such as cotton, flax, wool, and hair fibers, of synthetic fibers such as regenerated cellulose, cellulose acetate, polyamide, protein polymer, vinyl polymer, and the like fibers, or inorganic fibers such as glass, mineral, or metal fibers, or of mixtures of such fibers. Furthermore, the application of my invention is not limited to the usual types of woven or knitted fabrics but may also be used to decorate pile fabrics, paper, or fabrics made by processes such as combing, matting, or felting, e. g., a fabric composed of loosely meshed cotton fibers bonded together by the localized application of a resin. The present invention, moreover, is equally applicable whether a light or a heavy fabric is being decorated. (The term "fabric" as used in the claims includes all of these various types of materials as well as yarns, to the decorating of which my invention is also applicable.)

The following examples are typical illustrations of color concentrates prepared in accordance with the present invention and suitable for use either directly or cut with an appropriate vehicle:

EXAMPLE 1

A vinyl aromatic-diolefin copolymer gel having a semisolid consistency is prepared by suitably mixing the following ingredients until a smooth composition is obtained (parts by weight in this and other examples):

Xylene _____ 40
Copolymer of styrene and butadiene-1,3 prepared in accordance with Guss et al. 2,388,-685 (e. g., Styraloy 22) _____ 10

A low-crock color concentrate is prepared by incorporating the following into this copolymer gel:

| | |
|---|---|
| 50% solution of hydrophobic butylated melamine-formaldehyde resin in an equal admixture of butanol and xylene (e. g., Melmac 245–8) | 20 |
| Synthetic ferric oxide, yellow | 30 | the resulting mixture being ground on a three-roll mill until smooth.

EXAMPLE 2

A styrene-butadiene copolymer dispersion is prepared from the following:

| | |
|---|---|
| High-aromatic hydrocarbon solvent having a boiling range of 310 to 350° F. (e. g., Solvesso 100) | 25 |
| Copolymer of styrene and butadiene-1,3 prepared as in Example 1 | 10 | the mixture being agitated until a gel having a smooth salve-like consistency is obtained.

A pigmented lacquer is separately prepared from:

| | |
|---|---|
| Hydrocarbon solvent as above | 25 |
| 50% solution of hydrophobic butylated urea-formaldehyde resin in an equal admixture of butanol and xylene | 20 |
| Molybdated orange (complex of lead chromate and lead molybdate) | 20 |

The pigmented lacquer and the copolymer dispersion are then blended with suitable agitation to produce a color concentrate.

EXAMPLE 3

A copolymer dispersion is prepared by mixing the following:

| | |
|---|---|
| Turpentine | 45 |
| Copolymer of styrene and butadiene-1,3 prepared as in Example 1 | 10 | a smooth semisolid gel-like composition being obtained.

A pigmented resin solution is separately prepared by suitably flushing:

| | |
|---|---|
| Chrome yellow (lead chromate) | 25 | into:

| | |
|---|---|
| 50% solution of hydrophobic butylated melamine-formaldehyde resin in an equal admixture of butanol and xylene (as in Example 1) | 20 |

The pigmented resin is then blended with the copolymer dispersion to form a color concentrate.

The following example is a typical illustration of an emulsion vehicle concentrate for use in cutting the color concentrate of Examples 1 to 3:

Example I

A vehicle concentrate is prepared by forming a lacquer from the following:

| | |
|---|---|
| Mineral spirits | 25 |
| 70% drying oil-modified phthalic-glyceride alkyd resin (e. g., Beckasol No. 18) | 25 | and emulsifying thereinto:

| | |
|---|---|
| Water | 45 |
| Sodium chloride | 5 |

The alkyd resin has a viscosity of V to X on the Gardner scale and an acid number of 10 to 15.

This vehicle concentrate can then be cut by the addition of further mineral spirits and water in the proportions necessary to give either a printing or a dyeing vehicle having the body and the viscosity desired:

Example II

A printing vehicle is prepared by adding mineral spirits to the vehicle concentrate and emulsifying water thereinto in the following proportions:

| | |
|---|---|
| Vehicle concentrate of Example I | 6 |
| Mineral spirits | 20 |
| Water | 74 |

Example III

A typical pad-dyeing vehicle is prepared by addition of mineral spirits to the vehicle concentrate and emulsification of water thereinto in the following proportions:

| | |
|---|---|
| Vehicle concentrate of Example I | 6 |
| Mineral spirits | 40 |
| Water | 54 |

Printing pastes and pad-dyeing liquors can be prepared by cutting the color concentrate of Examples 1 to 3 with the printing vehicle and the pad-dyeing vehicle of Examples II and III, respectively. The proportions in which the color concentrate and the respective vehicle are mixed depend, of course, on the depth of shade desired in the finished fabric. Typical examples of a printing paste and of a pad-dyeing liquor are illustrated by the following:

EXAMPLE A

A printing paste giving a deep shade is prepared by cutting a color concentrate with the printing vehicle in the following proportions:

| | |
|---|---|
| Color concentrate of Example 1 | 1 |
| Printing vehicle of Example II | 2 |

A textile such as cotton percale printed with this paste exhibits substantially no crocking, possesses a soft hand, and has a full, even color value.

EXAMPLE B

A pad-dyeing liquor giving a medium shade is prepared by cutting a color concentrate with the pad-dyeing vehicle in the following proportions:

| | |
|---|---|
| Color concentrate of Example 2 | 1 |
| Pad-dyeing vehicle of Example III | 10 |

When a textile such as rayon is dyed with this liquor, it is extremely crockfast, exhibits no particular increase in stiffness, and has a good color.

The color concentrates can also be cut with a straight solvent vehicle, and the following example illustrates such a procedure for preparing a printing paste:

EXAMPLE C

| | |
|---|---|
| Color concentrate of Example 3 | 1 |
| Mineral spirits | 2 |

Similarly, the color concentrates can be cut with a vehicle comprising the copolymer dispersion itself, as follows:

EXAMPLE D

| | |
|---|---|
| Color concentrate of Example 2 | 1 |
| Copolymer dispersion (unpigmented) of Example 2 | 2 |
| Mineral spirits | 3 |

The proportion of copolymer in the final composition can also be increased by cutting the color concentrates with an emulsion vehicle having the copolymer dispersed in the lacquer phase, an example of which is illustrated by the following:

Example IV

| | |
|---|---|
| Vehicle concentrate of Example I | 6 |
| Copolymer dispersion (unpigmented) of Example 2 | 5 |
| Mineral spirits | 15 |
| Water | 74 |

The vehicle concentrate and the copolymer dispersion are blended, the mineral spirits is added thereto, and the water is emulsified thereinto.

The resulting vehicle can be used to cut a color concentrate in the manner indicated above.

I claim:

1. A low-crock textile-decorating composition comprising a pigmented colloidal dispersion of (1) a granular thermoplastic copolymer of a monovinyl aromatic compound in which the vinyl group is attached to a carbon atom of the aromatic nucleus and an aliphatic conjugated diolefin and (2) a volatile organic liquid which is a nonsolvent for the copolymer but has a swelling action therefor, the ratio of the copolymer to the pigment ranging from 0.05:1 to 100:1 by weight, the copolymer comprising the product prepared by polymerizing the vinyl aromatic compound in an aqueous emulsion at a temperature above 50° C. until at least 90% of the vinyl aromatic compound is polymerized and thereafter adding between 2.3 and 3.5 moles of the conjugated diolefin per mole of the vinyl aromatic compound initially present and polymerizing the conjugated diolefin in the emulsion at a temperature above 50° C.

2. The low-crock textile-decorating composition as claimed in claim 1, in which the colloidal dispersion is in the form of a semisolid gel of the vinyl aromatic-diolefin copolymer and the organic liquid.

3. A low-crock textile-decorating composition comprising a pigmented colloidal dispersion of (1) a granular thermoplastic copolymer of a monovinyl aromatic compound in which the vinyl group is attached to a carbon atom of the aromatic nucleus and an aliphatic conjugated diolefin and (2) a solution of a thermosetting resin in a volatile organic solvent which is a nonsolvent for the copolymer but has a swelling action therefor, the ratio of the copolymer to the pigment ranging from 0.05:1 to 100:1 by weight, the copolymer comprising the product prepared by polymerizing the vinyl aromatic compound in an aqueous emulsion at a temperature above 50° C. until at least 90% of the vinyl aromatic compound is polymerized and thereafter adding between 2.3 to 3.5 moles of the conjugated diolefin per mole of the vinyl aromatic compound initially present and polymerizing the conjugated diolefin in the emulsion at a temperature above 50° C.

4. A low-crock textile-decorating composition comprising a water-in-lacquer emulsion, the lacquer phase of which comprises a pigmented colloidal dispersion of (1) a granular thermoplastic copolymer of a monovinyl aromatic compound in which the vinyl group is attached to a carbon atom of the aromatic nucleus and an aliphatic conjugated diolefin and (2) a solution of a thermosetting resin in a volatile organic solvent which is a nonsolvent for the copolymer but has a swelling action therefor, the ratio of the copolymer to the pigment ranging from 0.05:1 to 100:1 by weight, the copolymer comprising the product prepared by polymerizing the vinyl aromatic compound in an aqueous emulsion at a temperature above 50° C. until at least 90% of the vinyl aromatic compound is polymerized and thereafter adding between 2.3 and 3.5 moles of the conjugated diolefin per mole of the vinyl aromatic compound initially present and polymerizing the conjugated diolefin in the emulsion at a temperature above 50° C.

5. The low-crock textile-decorating composition as claimed in claim 4, in which the organic solvent comprises a predominantly aromatic hydrocarbon solvent.

6. A low-crock textile-decorating composition comprising a pigmented colloidal dispersion of (1) a granular thermoplastic copolymer of styrene and butadiene-1,3 and (2) a volatile organic liquid which is a nonsolvent for the copolymer but has a swelling action therefor, the ratio of the copolymer to the pigment ranging from 0.05:1 to 100:1 by weight, the copolymer comprising the product prepared by polymerizing the styrene in an aqueous emulsion at a temperature above 50° C. until at least 90% of the styrene is polymerized and thereafter adding between 2.3 and 3.5 moles of the butadiene-1,3 per mole of the styrene initially present and polymerizing the butadiene-1,3 in the emulsion at a temperature above 50° C.

7. The low-crock textile-decorating composition as claimed in claim 6, in which the colloidal dispersion is in the form of a semisolid gel of the styrene-butadiene-1,3 copolymer and the organic liquid.

8. A low-crock textile-decorating composition comprising a pigmented colloidal dispersion of (1) a granular thermoplastic copolymer of styrene and butadiene-1,3 and (2) a solution of a thermosetting resin in a volatile organic solvent which is a non-solvent for the copolymer but has a swelling action therefor, the ratio of the copolymer to the pigment ranging from 0.05:1 to 100:1 by weight, the copolymer comprising the product prepared by polymerizing the styrene in an aqueous emulsion at a temperature above 50° C. until at least 90% of the styrene is polymerized and thereafter adding between 2.3 and 3.5 moles of the butadiene-1,3 per mole of the styrene initially present and polymerizing the butadiene-1,3 in the emulsion at a temperature above 50° C.

9. A low-crock textile-decorating composition comprising a water-in-lacquer emulsion, the lacquer phase of which comprises a pigmented colloidal dispersion of (1) a granular thermoplastic copolymer of styrene and butadiene-1,3 and (2) a solution of a thermosetting resin in a volatile organic solvent which is a non-solvent for the copolymer but has a swelling action therefor, the ratio of the copolymer to the pigment ranging from 0.05:1 to 100:1 by weight, the copolymer comprising the product prepared by polymerizing the styrene in an aqueous emulsion at a temperature above 50° C. until at least 90% of the styrene is polymerized and thereafter adding between 2.3 and 3.5 moles of the butadiene-1,3 per mole of the styrene initially present and polymerizing the butadiene-1,3 in the emulsion at a temperature above 50° C.

10. The low-rock textile-decorating composition as claimed in claim 9, in which the organic solvent comprises a predominantly aromatic hydrocarbon solvent.

11. A base for a low-crock textile-decorating composition comprising a semisolid gel of (1) a granular thermoplastic copolymer of a monovinyl aromatic compound in which the vinyl group is attached to a carbon atom of the aromatic nucleus and an aliphatic conjugated diolefin and (2) a volatile organic liquid which is a nonsolvent for the copolymer but has a swelling action therefor, the ratio of the organic liquid to the copolymer ranging from 3:1 to 10:1 by weight, the copolymer comprising the product prepared by polymerizing the vinyl aromatic compound in an aqueous emulsion at a temperature above 50° C. until at least 90% of the vinyl aromatic compound is polymerized and thereafter adding between 2.3 and 3.5 moles of the conjugated diolefin per mole of the vinyl aromatic compound initially present and polymerizing the conjugated diolefin in the emulsion at a temperature above 50° C.

12. The base as claimed in claim 11, in which the monovinyl aromatic compound comprises styrene and the conjugated diolefin comprises butadiene-1,3.

13. A low-crock clear for use in a textile-decorating composition comprising a water-in-lacquer emulsion, the lacquer phase of which comprises a colloidal dispersion of (1) a granular thermoplastic copolymer of a monovinyl aromatic compound in which the vinyl group is attached to a carbon atom of the aromatic nucleus and an aliphatic conjugated diolefin and (2) a volatile organic liquid which is a nonsolvent for the copolymer but has a swelling action therefor, the ratio of the organic liquid to the copolymer ranging from 1:1 to 100:1 by weight, the copolymer comprising the product prepared by polymerizing the vinyl aromatic compound in an aqueous emulsion at a temperature above 50° C. until at least 90% of the vinyl aromatic compound is polymerized and thereafter adding between 2.3 and 3.5 moles of the conjugated diolefin per mole of the vinyl aromatic compound initially present and polymerizing the conjugated diolefin in the emulsion at a temperature above 50° C.

14. A low-crock clear for use in a textile-decorating composition comprising a water-in-lacquer emulsion, the lacquer phase of which comprises a colloidal dispersion of (1) a granular thermoplastic copolymer of styrene and butadiene-1,3 and (2) a volatile organic liquid which is a nonsolvent for the copolymer but has a swelling action therefor, the ratio of the organic liquid to the copolymer ranging from 1:1 to 100:1 by weight, the copolymer comprising the product prepared by polymerizing the styrene in an aqueous emulsion at a temperature above 50° C. until at least 90% of the styrene is polymerized and thereafter adding between 2.3 and 3.5 moles of the butadiene-1,3 per mole of the styrene initially present and polymerizing the butadiene-1,3 in the emulsion at a temperature above 50° C.

15. The low-rock clear as claimed in claim 14, in which the colloidal dispersion is in the form of a semisolid gel of the styrene-butadiene-1,3 copolymer and the organic liquid and the ratio of the organic liquid to the copolymer ranges from 1:1 to 4:1.

SAMUEL LEE.

REFERENCES CITED

The following references are of record in the file of this patent:

UNITED STATES PATENTS

| Number | Name | Date |
|---|---|---|
| 2,383,937 | Kienle et al. | Sept. 4, 1945 |
| 2,388,685 | Guss et al. | Nov. 13, 1945 |

OTHER REFERENCES

Pages 1, 9, 10 and 12, Styraloy 22, published by Dow Chemical Co., Midland, Michigan, Feb. 1, 1943.